United States Patent [19]

Takahashi et al.

[11] Patent Number: 5,543,948
[45] Date of Patent: Aug. 6, 1996

[54] THERMOPLASTIC SATURATED NORBORNENE RESIN PHASE PLATE

[75] Inventors: Nobukazu Takahashi; Tsutomu Hani; Teiji Kohara; Tadao Natsuume, all of Kanagawa, Japan

[73] Assignee: Nippon Zeon Co., Ltd., Tokyo, Japan

[21] Appl. No.: 167,949

[22] PCT Filed: Jun. 24, 1992

[86] PCT No.: PCT/JP92/00803

§ 371 Date: Dec. 20, 1993

§ 102(e) Date: Dec. 20, 1993

[87] PCT Pub. No.: WO93/00598

PCT Pub. Date: Jan. 7, 1993

[30] Foreign Application Priority Data

Jun. 25, 1991 [JP] Japan .................................. 3-178891

[51] Int. Cl.$^6$ ...................... G02F 1/1335; G02F 1/1333
[52] U.S. Cl. ................................. 359/73; 359/74
[58] Field of Search ................. 359/73, 74, 63

[56] References Cited

U.S. PATENT DOCUMENTS

| | | | |
|---|---|---|---|
| 4,161,557 | 7/1979 | Suzuki et al. | 428/1 |
| 4,895,912 | 1/1990 | Satake et al. | 525/471 |
| 5,061,042 | 10/1991 | Nakamura et al. | 359/63 |
| 5,187,012 | 2/1993 | Takahashi et al. | 428/402 |

FOREIGN PATENT DOCUMENTS

| | | |
|---|---|---|
| 1-118819 | 5/1989 | Japan . |
| 2-136823 | 5/1990 | Japan . |
| 2-158701 | 6/1990 | Japan . |
| 2-227424 | 9/1990 | Japan . |
| 2-276842 | 11/1990 | Japan . |
| 2-285304 | 11/1990 | Japan . |
| 3-14882 | 1/1991 | Japan . |
| 3-122137 | 5/1991 | Japan . |
| 4-63807 | 2/1992 | Japan . |

OTHER PUBLICATIONS

Crystallization in Stretched and Unstretched EPDM Elastomers, B. J. R. Scholtens et al., Journal of Polymer Science: Polymer Physics Edition, vol. 22, pp. 1223–1238, 1984.

*Primary Examiner*—William L. Sikes
*Assistant Examiner*—Charles Miller
*Attorney, Agent, or Firm*—Lowe, Price, LeBlanc & Becker

[57] ABSTRACT

A phase plate comprises, as a birefringent layer, a film obtained by stretching and orienting a sheet of a thermoplastic saturated norbornene resin, which has been formed by melt forming. The phase plate of the invention is such that the birefringent layer is optically even at the whole surface, and such optical evenness remains constant even by changes of temperature, humidity and/or the like. The phase plate of the invention can be used in parts for polarization microscopes, parts for liquid crystal displays, etc., and is particularly suitable for use in a phase plate for liquid crystal displays.

9 Claims, No Drawings

THERMOPLASTIC SATURATED NORBORNENE RESIN PHASE PLATE

TECHNICAL FIELD

The present invention relates to a phase plate, and more particularly to a phase plate, which has, as a birefringent layer, a stretched and oriented film composed of a thermoplastic saturated norbornene resin, and is optically even.

BACKGROUND ART

In order to achieve high definition and large area in liquid crystal display, a high-multiplex operation display in which the twist angle of liquid crystal molecules was controlled greater than conventional 90 degrees has been put to practical use. This is generally called a supertwisted nematic mode (STN-type mode), and an SBE mode, an STN mode and the like are known. In this STN-type mode, steep deformation of molecular orientation by application of voltage is combined with the optical effect of birefringence to optimize retardation (a product of the refractive index anisotropy of a liquid crystal and a cell gap=$\Delta$n.d) and the azimuthal angle of a polarizer so as to achieve still better display characteristics. In recent years, black-and-white display has come to be achieved in the STN mode by a system in which a phase plate is used to compensate for a phase difference of transmitted light, which has been caused by the birefringence effect, or the like. It is also possible to form full-color images by supplementing color filters, as needed.

Incidentally, such a phase plate is a plate used in shifting the relative phase of a polarized component of light and made of a birefringent material. In the plate, an oriented film made of a synthetic resin is used as a birefringent layer. Examples of the structure of the phase plate include a single-layer structure composed of one birefringent layer, a multi-layer structure obtained by laminating two or more birefringent layers which are identical or different in birefringent behavior, a structure with a protective layer, and the like (for example, Japanese Patent Application Laid-Open No. 158701/1990).

In order to provide bright colors and high-definition images, for example, a phase plate for liquid crystal displays is required that its birefringent layer is optically even at the whole surface and undergoes no change in optical properties even by changes of temperature and/or humidity. In particular, if the phase plate is used in a liquid crystal display panel for installation in a car, it is required to withstand a temperature of at least 60° C. or higher, preferably 80° C. or higher, more preferably 100° C. or higher because it is predicted that the panel would be used under severe conditions.

As synthetic resin materials for such phase plates, there have heretofore been used various kinds of film-forming resins such as phenoxyether type crosslinkable resins, epoxy resins, polycarbonate resins, allylate resins and polycarbonate resins.

However, the phenoxyether type crosslinkable resins, epoxy resins, polycarbonate resins, allylate resins and the like are difficult to stretch evenly, and moreover are insufficient in moisture resistance, and hence have hygroscopicity of the order of 0.1–0.2 wt. %. Therefore, their retardation stability is lowered by changes of humidity in a service environment. Besides, since the polycarbonate resins, allylate resins and the like have high heat resistance, their stretching temperature is high. Therefore, it is hard to control the stretching temperature, and hence to produce an optically even phase plate.

A film obtained by stretching and orienting a sheet produced by solvent casting is excellent in surface smoothness, but involves problems that it is poor in productivity, and may not be used according to its service environment because a solvent remains therein. Therefore, an extrusion process making use of a T-die, or the like is used in the polycarbonate resins and the like. However, if a sheet having a thickness of 100–200 μm is formed, the unevenness of thickness can be controlled only to the extent of 6–8 μm.

In addition, since these oriented, synthetic resin films generally have a photoelastic coefficient as great as 50–100× $10^{-13}$ cm$^2$/dyne, there is a problem that their retardation values are changed greatly by a slight stress. Besides, the unevenness of thickness which occurs in the sheets before stretching directly influences the scattering of retardation after stretching.

As described above, the phase plates composed individually of the oriented, synthetic resin films conventionally known are not fully satisfactory for liquid crystal displays. There is hence demand for improving them.

DISCLOSURE OF THE INVENTION

It is an object of the present invention to provide a phase plate for liquid crystal displays, in which a birefringent layer is optically even at the whole surface, and such optical evenness remains constant even by changes of temperature, humidity and/or the like.

The present inventors have carried out an extensive investigation with a view toward overcoming the above-described problems involved in the prior art. As a result, it has been found that an oriented film obtained by stretching a sheet of a thermoplastic saturated norbornene resin formed by melt forming has excellent properties for a phase plate for liquid crystal displays. The present invention has been led to completion on the basis of this finding.

According to the present invention, there is thus provided a phase plate comprising, as a birefringent layer, a film obtained by stretching and orienting a sheet of a thermoplastic saturated norbornene resin, which has been formed by melt forming.

BEST MODE FOR CARRYING OUT THE INVENTION

Features of the present invention will hereinafter be described in detail.
Thermoplastic saturated norbornene resin:
The thermoplastic saturated norbornene resins useful in the practice of the present invention are known resins from Japanese Patent Application Laid-Open Nos. 14882/1991, 122137/1991, 63807/1992, etc. Specific examples thereof may include ring-opened polymers of a norbornene monomer, hydrogenation products thereof, addition polymers of a norbornene monomer, addition polymers of a norbornene monomer and an olefin, and the like.

The norbornene monomers are also known from the above-described publications, Japanese Patent Application Laid-Open Nos. 227424/1990 and 276842/1990, etc. Examples thereof may include norbornene, dicyclopentadiene, dimethanooctahydronaphthalene, alkyl-, alkylidene- or aromatic-substituted products thereof, and substitution products of these substituted or unsubstituted compounds with a polar group such as a halogen, hydroxyl group, ester group, alkoxy group, cyano group, amide group, imide group, silyl group or the like.

More specific examples thereof may include norbornene, 5-methyl-2-norbornene, 5-dimethyl-2-norbornene, 5-ethyl-2-norbornene, 5-butyl-2-norbornene, 5-ethylidene-2-norbornene and the like, and substitution products of these compounds with a polar group such as a halogen; dicyclopentadiene, 2,3-dihydrodicyclopentadiene and the like; dimethano-octahydronaphthalene, alkyl- and/or alkylidene-substituted products thereof, and substitution products of these compounds with a polar group such as a halogen, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, 6-methoxycarbonyl-1,4:5,8-dimethano-1,4,4a,5,6,7,8,8a-octahydronaphthalene, etc.; trimers and tetramers of cyclopentadiene, for example, 4,9:5,8-dimethano-3a,4,4a,5,8,8a,9,9a-octahydro-1H-benzoindene, 4,11:5,10:6,9-trimethano-3a,4,4a,5,5a,6,9,9a,10,10a,11,11a-dodecahydro-1H-cyclopentaanthracene; and the like.

In the present invention, other ring-opening polymerizable cycloolefins may be used in combination within limits not impeding the object of this invention. Specific examples of such cycloolefins may include compounds having a reactive double bond, such as cyclopentene, cyclooctene and 5,6-dihydrodicyclopentadiene.

The thermoplastic saturated norbornene resin useful in the practice of the present invention has a number average molecular weight in a range of generally 25,000–100,000, preferably 30,000–80,000, more preferably 35,000–70,000 as determined by gel permeation chromatography (GPC) making use of toluene as a solvent. If the number average molecular weight would be too low, a resin deteriorated in mechanical strength will be provided. If the number average molecular weight would be too high, easiness of operation upon the synthesis of the resin, and the formation and stretching of a sheet will become poor.

It is desired that the thermoplastic saturated norbornene resin used in the present invention should have a glass transition temperature (Tg) of generally 90° C. or higher, preferably 110° C. or higher, more preferably 130° C. or higher.

If the thermoplastic saturated norbornene resin is obtained by hydrogenating a ring-opened polymer of a norbornene monomer, its hydrogenation rate is generally controlled to at least 90%, preferably at least 95%, more preferably at least 99% from the viewpoint of resistance to deterioration by heat, resistance to deterioration by light, and the like.

The thermoplastic saturated norbornene resin is excellent in transparency, heat resistance, moisture resistance, chemical resistance and the like. In particular, a resin having hygroscopicity of generally at most 0.05%, preferably at most 0.01% can be provided with ease. Further, its photoelastic coefficient is as small as $3-9 \times 10^{-13}$ cm$^2$/dyne. Such a resin is hence a material suitable for use in producing an optically even oriented film.

The thermoplastic saturated norbornene resin used in the present invention may be added with various additives such as an age resistor such as phenolic or phosphoric, an antistatic agent and an ultraviolet stabilizer if desired.

Sheet:

The oriented film useful in the practice of the present invention is produced by first forming the thermoplastic saturated norbornene resin into a sheet and then stretching and orienting the sheet.

In the present invention, the sheet is formed by a melt forming. Examples of the melt forming may include melt-extrusion processes such as a process making use of a T-die and an inflation process, calendering processes, hot pressing processes and injection-molding processes. Of these, the melt-extrusion process making use of a T-die is preferred, which the process can make the unevenness of thickness small, is easy to form the resin into a sheet having a thickness of about 50–500 μm, and can control the absolute value of retardation and scattering thereof upon the formation of a sheet.

The conditions of the melt forming are substantially the same as those used in polycarbonate resins having a Tg similar to the norbornene resin. For example, in the melt-extrusion process making use of a T-die, it is preferable to select the conditions in which the temperature of the resin is controlled to about 240°–300° C. and the temperature of take-off rolls is controlled to a relatively high temperature of about 100°–150° C., whereby the resin can be slowly cooled. Besides, in order to minimize surface defects such as die lines, the die is required to have a structure in which residence portions are lessened to the utmost, and it is preferable to use a die free of any flaws or the like on its interior or lip as much as possible.

These sheets may also be subjected to surface polishing, as needed, to more increase surface precision.

The thickness of the sheet before stretching is generally controlled to about 50–500 μm. It is preferred that the unevenness of thickness be smaller. The unevenness of thickness may fall within a range of ±8%, preferably ±6%, more preferably ±4% as a whole. The absolute value of the retardation of the sheet may be 50 nm or smaller, preferably 30 nm or smaller, more preferably 20 nm or smaller at the whole surface. The greater the unevenness of thickness of the sheet, the wider the scattering of retardation of the stretched and oriented film.

Stretched and oriented film:

The stretched and oriented film useful in the practice of the present invention is obtained by uniaxially stretching the sheet. Molecules of the film are oriented by the stretching. The thus-obtained stretched and oriented film has a certain retardation value. Incidentally, the uniaxial stretching may be of substantially uniaxial stretching, for example, biaxial stretching in which a sheet is stretched within limits not influencing the molecular orientation of the film, and then stretched in a uniaxial direction to orient molecules of the film.

The draw ratio is 1.3–10 times, preferably 1.5–8 times. It is only necessary to stretch the sheet at a draw ratio within this range so as to have a predetermined retardation value. If the draw ratio is too low, the absolute value of retardation does not increase to fail to obtain the predetermined value. If the draw ratio is too high, the sheet to be stretched may be broken in some cases.

The stretching is generally conducted in a temperature range of from Tg of the resin forming the sheet to (Tg+50)°C., preferably from Tg to (Tg+40)°C. If the stretching temperature is too low, the sheet is broken. If the temperature is too high, the resulting film does not undergo molecular orientation. It is hence impossible to obtain the desired phase plate.

The thus-obtained film in which molecules have been oriented by the stretching has a retardation value of a certain level. In order to use the stretched and oriented film in a phase plate, the film must have an absolute value of retardation of 30–1000 nm, preferably 50–800 nm as determined at a wavelength of 550 nm. As necessary for its purpose, the film is adjusted so as to have the desired retardation value within the above range. The retardation can be controlled by the retardation of the sheet before the stretching, the draw ratio, the stretching temperature and the thickness of the stretched and oriented film. If the sheet before the stretching has an even thickness, there is a tendency for the absolute value of retardation of the film to increase as its draw ratio is high. Therefore, it is possible to obtain a stretched and oriented film having the desired retardation by changing the draw ratio.

The scattering of retardation value is preferably as narrow as possible. With respect to the stretched and oriented films according to the present invention, the scattering of retardation at the wavelength of 550 nm is as narrow as a range of generally from −50 nm to +50 nm, preferably from −30 nm to +30 nm, more preferably −20 nm to +20 nm.

The in-plane scattering of retardation and the unevenness of thickness of the film can be lessened by using a sheet of which the scattering and unevenness are small, and moreover by stretching the sheet under even stress. In order to conduct such stretching, it is desirable that the sheet should be stretched under even distribution of temperature, preferably in an environment in which the temperature has been controlled within a range of ±5° C., more preferably ±2° C., most preferably ±0.5° C.

Application:

Applications of the phase plates according to the present invention include parts for polarization microscopes, parts for liquid crystal displays, etc.

Phase plate for liquid crystal displays:

The basic structures of the phase plates according to the present invention when used as phase plates for liquid crystal displays include (1) a structure having a birefringent layer made of a single layer of the stretched and oriented film, and (2) a multi-layer structure having a birefringent layer made of a plurality of birefringent films including two or more of the stretched and oriented films. In the case of the multi-layer structure, the birefringent films may be stuck together with their optic axes of wave normal aligned with each other, and besides stuck together in such a manner that their optic axes form a certain angle as necessary for its purpose. For example, when a plurality of stretched and oriented films whose retardation values vary are laminated with their optic axes aligned in the same direction, the additive properties of the retardation are made good use to obtain a multi-layer film having various retardation values. The number of layers laminated is about 2–6. Examples of an adhesive used in the lamination may include emulsion adhesives, ultraviolet-curing adhesives, thermosetting adhesives, hot-melt adhesives, etc.

Other structures of the phase plates for liquid crystal displays according to the present invention include (3) a structure in which an optically isotropic protective layer (for example, an optically isotropic polycarbonate film or the like) is laminated on at least one side of the birefringent layer, (4) a sticker-type structure in which a release sheet is laminated on at least one side of the birefringent layer or the optically isotropic protective layer through a pressure-sensitive adhesive layer (for example, an acrylic pressure-sensitive adhesive layer) (which can be easily stuck on a liquid crystal cell or the like by peeling the release sheet), (5) a structure in which a phase plate is integrally laminated on a polarizing plate into a phase plate-cum-polarizing plate, and the like.

The stretched and oriented films showing birefringent behavior and composed of the thermoplastic saturated norbornene resin are not only resistant to temperature changes, but also excellent in moisture resistance and water resistance. In the conventional liquid crystal displays, a moisture-resistant and water-resistant protective layer has been often provided to protect an operating liquid crystal cell as needed. However, sufficient moisture resistance and water resistance can be achieved without providing at least one of such protective layers when the phase plate for liquid crystal displays according to the present invention is used, resulting in simplification of structure.

EXAMPLES

The present invention will hereinafter be described more specifically by the following Referential Example, Example and Comparative Example. However, it should be borne in mind that this invention is not limited to and by these examples. Incidentally, all designations of "part" or "parts" and "%", which will appear in the following examples, mean part or parts by weight and wt. % unless expressly noted.

The following methods were followed for the measurement of the physical properties in the following examples.

(1) The number average molecular weight was measured by GPC making use of toluene as a solvent.

(2) The hydrogenation rate was determined by $^1$H-NMR.

(3) The glass transition temperature (Tg) was measured by using, as a sample, a part of a sheet before stretching in accordance with DSC.

(4) The retardation value was determined by means of a Berek compensator at a wavelength of 550 nm.

(5) The thickness of sheet and film was measured by means of a dial thickness gauge.

(6) The light transmittance was determined in the following manner. The wavelength of light to be caused to pass through a sheet before stretching or a stretched and oriented film was continuously changed within a range of 400–700 nm to measure a light transmittance at each wavelength by means of a spectrophotometer. The minimum transmittance in this measurement was regarded as a light transmittance for the sheet before stretching or the stretched and oriented film.

Comparative Example 1

A polycarbonate resin (Lexan 131-111, trade name, product of GE Co.) was melt-extruded through a T-die 300 mm wide by means of a single screw extruder equipped with a full-flighted screw 40 mm long, and the resulting extrudate was taken up by chill rolls composed of three rolls 300 mm across, thereby forming a sheet. At this time, the temperature of the resin in the die was 285° C., and the temperatures of the first, second and third chill rolls were 120° C., 120° C. and 100° C. in that order.

Since both side edges of the thus-cooled extrudate became uneven in thickness, the portions were trimmed by 20 mm in width to obtain a sheet before stretching, which had a Tg of 141° C., an average thickness of 120 μm, an unevenness of thickness of ±8 μm, an average retardation value of 15 nm and an in-plane scattering of retardation value of ±20 nm.

The thus-obtained sheet before stretching was uniaxially stretched at a draw ratio of 1.5 times under control at 155±3° C. to obtain a stretched film. The film had an average thickness of 80 μm, an unevenness of thickness of ±6 nm, an average retardation value of 550 nm and an in-plane scattering of retardation value of ±90 nm.

The stretched film was held at 80° C. for 2 hours and then cooled to room temperature to determine a retardation value. The absolute value of retardation was found to be 540 nm on the average. The rate of change was 2% compared with the film before holding at 80° C.

Referential Example 1

To 6-methyl-1,4,5,8-dimethano-1,4,4a,5,6,7,8,8a-octahydronaphthalene (hereinafter abbreviated as "MTD"), were added, as a polymerization catalyst, 10 parts of a 15% solution of triethylaluminum in cyclohexane, 5 parts of triethylamine and 10 parts of a 20% solution of titanium tetrachloride in cyclohexane, thereby conducting ring-opening polymerization in cyclohexane. The thus-obtained ring-opened polymer was hydrogenated with a nickel catalyst to obtain a polymer solution. This polymer solution was solidified in isopropyl alcohol, and the resulting solids were dried to obtain a resin in the form of powder. The resin had a number average molecular weight of 40,000, a hydrogenation rate of at least 99.8% and a Tg of 142° C.

Example 1

The powdery resin obtained in Referential Example 1 was melted at 250° C. to form pellets. These pellets were used to produce a sheet in the same manner as in Comparative Example 1. At this time, the temperature of the resin in the die was 275° C., and the temperatures of the first, second and third chill rolls were 120° C., 120° C. and 100° C. in that order.

Since both side edges of the thus-obtained sheet before stretching became uneven in thickness, the portions were trimmed by 20 mm in width to observe the surface of the sheet visually and through an optical microscope. As a result, none of blowing, streaks, marks and the like were recognized. The sheet had a Tg of 139° C., an average thickness of 150 μm, an unevenness of thickness of ±4 μm or smaller, a light transmittance of 90.5%, retardation values of 22 nm on the average and of 22 nm in the plane, and an in-plane scattering of retardation value of ±10 nm.

The sheet before stretching was uniaxially stretched at a draw ratio of 2.5 times under control at 140°±2° C. to obtain a stretched and oriented film.

The stretched and oriented film had an average thickness of 55 μm, an unevenness of thickness of ±1.5 μm, an average retardation value of 580 nm and an in-plane scattering of retardation value of ±20 nm.

The stretched and oriented film was held at 80° C. for 2 hours and then cooled to room temperature to determine a retardation value. It was found to be 575 nm on the average.

The rate of change was 1% compared with the film before holding at 80° C. Therefore, this stretched and oriented film was excellent in retardation stability to temperature change compared with the film made of the polycarbonate, and was narrow in in-plane scattering of retardation value.

Industrial Applicability

According to the present invention, there are provided phase plates optically even and excellent in heat resistance and moisture resistance. The phase plates of the present invention can be used in parts for polarization microscopes, parts for liquid crystal displays, etc.

We claim:

1. A phase plate comprising, as a birefringent layer, a film obtained by uniaxially stretching and orienting a sheet of a thermoplastic saturated norbornene resin at a draw ratio within a range of 1.3–10 times, wherein the thermoplastic saturated norbornene resin has a number average molecular weight ranging from 25,000 to 100,000 and a glass transition temperature of 90° C. or higher, and the sheet is formed from the thermoplastic saturated norbornene resin in accordance with a melt-extrusion process making use of a T-die and has a thickness ranging from 50 to 500 μm.

2. The phase plate as claimed in claim 1, wherein a retardation value of the stretched and oriented film at a wavelength of 550 nm falls within a range of 30–1000 nm.

3. The phase plate as claimed in claim 1, wherein an in-plane scattering of retardation value of the stretched and oriented film at a wavelength of 550 nm falls within range of from −50 nm to +50 nm.

4. The phase plate as claimed in claim 1, wherein the birefringent layer has a multi-layer structure in which at least two stretched and oriented films have been laminated on each other.

5. The phase plate as claimed in claim 4, wherein the multi-layer structure is such that at least two stretched and oriented films are laminated with their optic axes aligned in the same direction.

6. The phase plate as claimed in claim 1, wherein an optically isotropic protective layer is laminated on at least one side of the birefringent layer.

7. The phase plate as claimed in claim 1, wherein a release sheet is laminated on at least one outermost side of the birefringent layer through a pressure-sensitive adhesive layer.

8. The phase plate as claimed in claim 1, wherein a polarizing plate is integrally laminated thereon.

9. The phase plate as claimed in claim 1, which is a phase plate for liquid crystal displays.

* * * * *